United States Patent [19]

Purcell

[11] Patent Number: 5,173,793
[45] Date of Patent: Dec. 22, 1992

[54] LIQUID CRYSTAL SHUTTER FOR BACKLIT DIGITIZER

[75] Inventor: Alexander M. Purcell, Guilford, Conn.

[73] Assignee: Summagraphics Corporation, Seymour, Conn.

[21] Appl. No.: 869,824

[22] Filed: Apr. 15, 1992

Related U.S. Application Data

[63] Continuation of Ser. No. 417,868, Oct. 6, 1989, abandoned.

[51] Int. Cl.$^5$ ............................................... G02F 1/13
[52] U.S. Cl. ........................................ 359/85; 359/36
[58] Field of Search ................. 178/18; 340/705, 784; 359/36, 443, 448, 85

[56] References Cited

U.S. PATENT DOCUMENTS

| | | |
|---|---|---|
| 4,088,400 | 5/1978 | Assouline et al. ............... 359/41 |
| 4,588,982 | 5/1986 | Goodwin ...................... 340/347 P |
| 4,724,311 | 2/1988 | Mechlenburg ..................... 359/41 |
| 4,786,146 | 11/1988 | Ledebuhr ......................... 359/39 |
| 4,796,019 | 1/1989 | Auerbach ........................ 340/712 |
| 4,803,737 | 2/1989 | Sato et al. ........................ 382/65 |
| 4,873,398 | 10/1989 | Hubby, Jr. ....................... 340/784 |

Primary Examiner—Andrew J. James
Assistant Examiner—Sara W. Crane
Attorney, Agent, or Firm—Rosen, Dainow & Jacobs

[57] ABSTRACT

A digitizer system comprises a source of a light for producing an image, a shutter, and a transparent or translucent digitizer tablet. The source is positioned to direct the image to the tablet via the shutter. The shutter comprises a liquid crystal layer and transparent planar conductors on opposite surfaces of the layer. The system further comprises a source of an adjustable voltage connected between the planar conductors for adjusting the transmissivity of the shutters.

7 Claims, 2 Drawing Sheets

| Light Transmission Control ||||||
|---|---|---|---|---|---|
| Manual ||| Auto |||
| 1 | 2 | 3 | Natural Density Steps | Up △ | 100 % |
| 4 | 5 | 6 | | | 75 % |
| 7 | 8 | 9 | | ▽ Down | 25 % |
| * Stop | 0 | # Enter | | | 10 % |

LIQUID CRYSTAL SHUTTER FOR BACKLIT DIGITIZER

This application is a continuation of application Ser. No. 07/417,868filed Oct. 6, 1989, now abandoned.

BACKGROUND OF THE INVENTION

This invention relates to a shutter for optical systems, and is more in particular directed to the provision of a shutter that enables the control of the intensity of light in a backlit digitizer tablet for CRT's or displays.

SUMMARY OF THE INVENTION

Briefly stated, the invention comprises a digitizer system comprising a source of a light for producing an image, a shutter, and a transparent or translucent digitizer tablet. The light source is positioned to direct the image to the tablet via the shutter. The shutter comprises a liquid crystal layer and transparent planar conductors on opposite surfaces of the layer. The system further comprises means for applying a voltage between the planar conductors, and means for adjusting the voltage, whereby the intensity of light viewable from the tablet may be adjusted. The voltage adjusting means may comprise a menu section on the digitizer tablet, and means responsive to selection of the menu for adjusting the voltage.

In accordance with a further feature of the invention, an optical coordinate position determining system comprises a transparent or translucent tablet with a viewing side and a rear side opposite the viewing side, and a light source positioned to direct light toward the rear side, the system comprises means for providing output signals corresponding to a selected position on the tablet. A shutter is positioned between the tablet and the light source. The shutter comprises a pair of parallel transparent spaced apart planar conductors, and a liquid crystal material between the planar conductors. The system further comprises control means for applying an adjustable voltage between the planar conductors, whereby the transmissivity of the shutter is responsive to the amplitude of the adjustable voltage.

The system may further comprise a wand adapted to be selectively directed toward coordinates of the tablet for producing an output that is a function of the location of the wand. The tablet may have a menu section, the control means comprises means being responsive to the output signals of the wand for adjusting voltages applied between the planar conductors.

BRIEF DESCRIPTION OF THE DRAWING

In order that the invention may be more clearly understood, it will now be disclosed in greater detail with reference to the accompanying drawing, wherein.

DETAILED DISCLOSURE OF THE INVENTION

Figure 1:
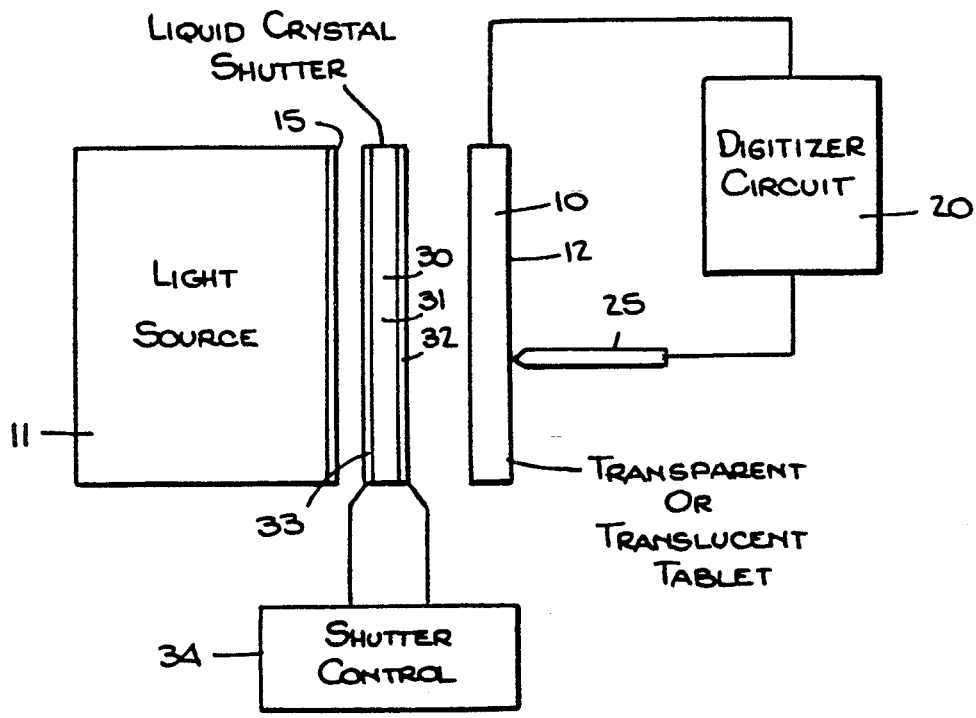
FIG. 1 is a block diagram of a digitizer shutter system in accordance with one embodiment of the invention.

Referring now to the drawings, FIG. 1 illustrates a backlit digitizer system in accordance with one embodiment of the invention comprising a transparent or translucent digitizer panel or tablet 10, and a light source 11 for directing light toward the tablet 10. The light source may be, for example, a CRT, whereby a presentation on the screen of the CRT is visible from the viewing side 12 of the tablet. The light source may alternatively be any other source of light having .features whose locations can be digitized, or it may constitute a plane source of light passing through a film 15, such as an X-Ray film or map film. The digitizer tablet 10 is coupled to a digitizer circuit 20 for applying signals to the tablet, and/or receiving signals from the tablet, enabling the identification of determined locations on the tablet. In order to enable such determination, the tablet may be associated with a wand 25 also coupled to the digitizer circuit 20.

Backlit digitizing tablets of the above type are disclosed, for example, in copending applications Ser. No. 417,869now U.S. Pat. No. 4,977,315, wherein the tablet includes a layer of a liquid crystal material provided with orthogonally oriented transparent conductor groups, the conductor groups are separately sequentially scanned, and a light detecting wand is employed to detect light discontinuities resulting from the energization of the local region of the liquid crystal tablet adjacent the wand.

It is of course apparent the other types of transparent or translucent digitizing tablets may be alternatively employed, being dependent for example upon electrostatic or magnetic fields for the determination of the coordinates of the wand, and that a touch control screen may also be employed.

It is desirable in such a system to be able to control the intensity of light at the viewing side 12 of the screen. For this purpose, in accordance with the invention, a shutter 30 is positioned between the light source 11 and the tablet 10. This shutter is comprised of a layer 31 of a liquid crystal material between a pair of parallel transparent planar conductors 32, 33. The conductors 32, 33 of the shutter are connected to a shutter control circuit 34 which, in a simple embodiment of the invention, may comprise a variable source of voltage. Since the light transmissivity of the liquid crystal layer 31 is a function of the voltage applied thereto, the adjustment of the voltage by any conventional means enables control of the intensity of light reaching the side 12 of the tablet 10.

Figure 2:
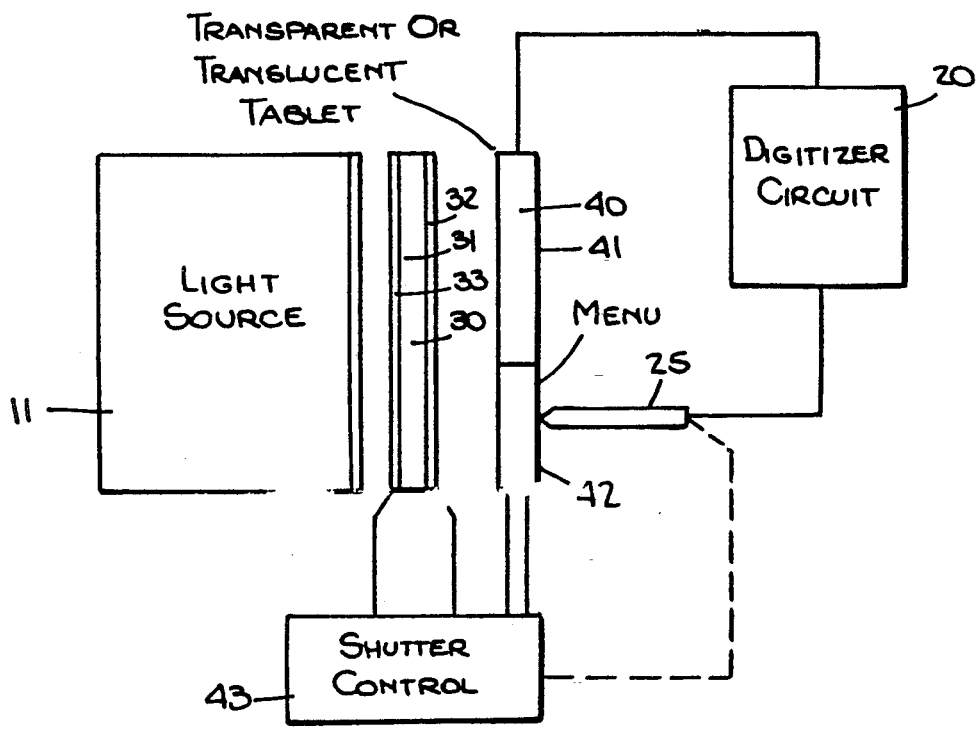
FIG. 2 is a block diagram of a digitizer shutter system in accordance with another embodiment of the invention.

In accordance with a further embodiment of the invention, as illustrated in FIG. 2, digitizer tablet 41, which may be constructed functionally in the same manner as the tablet 10 of FIG. 1, having a viewing side 41, has a portion 42 thereof dedicated for use as a menu. In this arrangement, when the wand is pointed to the menu portion 42, the control circuit 43 is controlled to adjust the voltage applied to the shutter 30 in the above discussed manner. For this purpose, the shutter control circuit may be connected to control the application of scanning signals or the like to the menu portion 42, when the wand being connected to the control circuit to enable sensing the location of the wand in that portion of the tablet. Alternatively, the wand may be connected to the digitizer circuit 20 to detect the positioning of the wand at any location on the tablet, with the control circuit being in turn activated by the digitizer circuit.

It is of course apparent that the shutter control circuit 34,43 may form a part of the digitizer circuit, and that the digitizer circuit may be comprised of a microcomputer programmed to apply scanning signals to the tablet for sensing by the wand, or to scan the tablet for the presence of signals from the wand. Such digitizing arrangements are well known, and hence the detailed discussion thereof is not considered necessary herein.

Figures 3, 4:
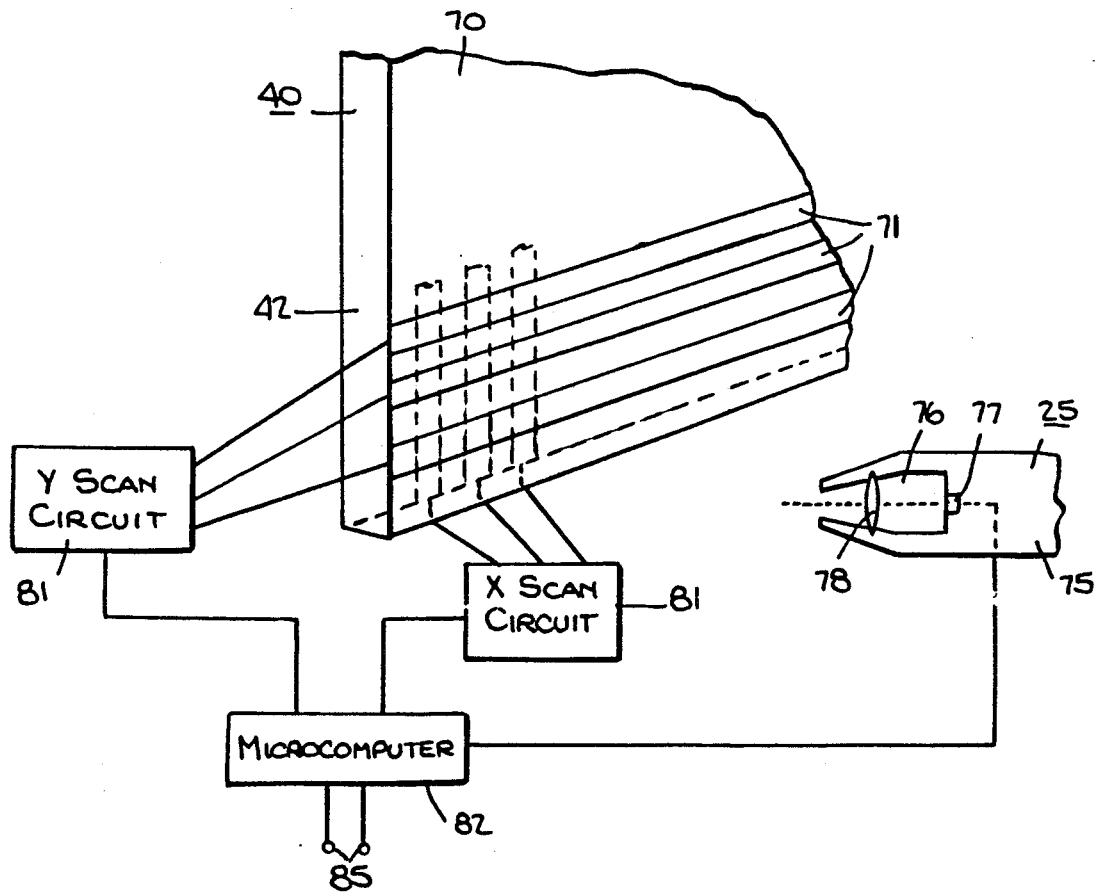
FIG. 3 is an illustration of a control panel in accordance with the invention.
FIG. 4 is a partially perspective illustration of control arrangement that may be employed in accordance with the invention.

FIG. 3 illustrates a suitable panel 50 that may be used for the menu portion 42 of the digitizer tablet. As illustrated, a numeric keypad section 51 enables the entry of numbers corresponding to the desired percentage of light to be passed through the shutter. UP and DOWN keypads 52, 53 enable continuous increases or decreases of the transmission of light, as long as the respective keypad area is pointed to. Areas 54 at the right side of the tablet enable the operation to control specific percentages of light, for convenience. Touching or pointing to the various keypads or areas thus permits the operator to adjust the light level of light at the viewing side of the tablet.

It will of course be apparent that adjustment of the shutter voltage by means of a panel on the digitizer tablet also affects the light received by the adjustment panel. Accordingly, the shutter control 43 has a memory for storing the current transmission percentage, so that the correct desired adjustment of the light intensity may be assured.

While, as above discussed, the digitizer tablet employed with the invention may be of any type, FIG. 4 illustrates one example of such a device. This arrangement is discussed in greater detail in copending application Ser. No. 417,869 now U.S. Pat. No. 4,977,315. As illustrated, the tablet 40 is comprised of a liquid crystal layer 70. Parallel spaced apart transparent conductor strips 71 are provided on one surface of the layer 70, and parallel spaced apart transparent conductor strips 72 are provided on the opposite or rear side of the tablet. The strips 72 extend orthogonally of the strips 71. The wand 25 has a body 75 with a cavity 76 in one end thereof. A light sensor 77 in the cavity is positioned to receive light, via a lens 78, from the tablet when the end thereof is placed against the tablet. When no voltages are applied to the conductors 71, 72, the tablet portion in which they are provided is substantially fully transmissive.

The conductors 71 are connected to be scanned by a scan circuit 80 controlled by a microcomputer 82, and the conductors 72 are connected to be scanned by a scan circuit 81 controlled by the microcomputer. The output of the wand 25 is also coupled to the microcomputer, which may form a part of the shutter control circuit of the system of FIG. 2. If the conductors 71 are sequentially scanned, i.e. have their voltages raised, while the conductors 72 are held at a fixed lower potential, it is apparent that a darkened horizontal bar will move in the Y direction of the menu portion, thereby producing a pulsatory output from the wand when the bar passes the current location of the wand. Similar scanning of the conductors 72 enables the generation of another pulse, at the current X position of the wand, when a darkened vertical bar passes the location of the wand. Timing information is thus applied to the microcomputer 81 related to the keypad of the menu portion that has been indicated, whereby the microcomputer provides a voltage output at terminals 85 for application to the shutter, to control the transmissivity of the shutter accordingly.

While the invention has been disclosed and described with reference to a single embodiment, it will be apparent that variations and modification may be made therein, and it is therefore intended in the following claims to cover each such variation and modification as falls within the true spirit and scope of the invention.

What is claimed is:

1. A digitizer system comprising an imaging device comprising a source of a light for producing and projecting an image, a non-imaging light shutter in the image projecting path, and a transparent or translucent digitizer tablet, said source being positioned to direct said image to said tablet via said shutter, said shutter located apart from said source and said tablet and comprising a liquid crystal layer and single transparent planar conductors each covering the entire area of opposite surfaces of said layer within the image projection path, said system further comprising means for applying a voltage between said planar conductors, and means for adjusting said voltage, whereby the intensity of the light image viewable from said tablet may be adjusted.

2. The system of claim 1 wherein said means for adjusting said voltage comprises a menu section on said digitizer table, and means responsive to selection of an item from said menu for adjusting said voltage.

3. In an optical coordinate position determining system having a transparent or translucent tablet with a viewing side and a rear side opposite said viewing side, and a light source positioned to produce and project a light image toward said rear tablet side said system comprising means for providing output signals corresponding to a selected position on said tablet, the improvement comprising a non-imaging shutter positioned as a separate element physically located between said tablet and said light source but entirely within the path of said light image, said shutter comprising a pair of parallel transparent spaced apart planar conductors, and a liquid crystal material between said planar conductors, said system further comprising control means for applying an adjustable voltage between said planar conductors, whereby the transmissibility of said shutter and the intensity of the viewable image on the tablet is responsive to the amplitude of said adjustable voltage.

4. The optical coordinate position determining system of claim 3 further comprising a wand adapted to be selectively directed toward coordinates of said tablet for producing an output that is a function of the location of said wand, wherein said tablet comprises a menu section, said control means comprising means response to said output signals of said wand for adjusting voltages applied between said planar conductors.

5. The optical coordinate position determining system of claim 3 wherein said light source comprises a CRT.

6. In an optical coordinate position determining system for digitizing an image, comprising a transparent or translucent tablet with a viewing side and a rear side opposite said viewing side, a wand connected to and adapted to be selectively directed toward coordinates of said tablet for producing an output that is a function of the location of said wand, a light source positioned to direct light toward said rear tablet side, a light-controlling shutter positioned as a separate element physically located between said rear tablet side and said light source but entirely within the path of said light to said rear tablet side, said light-controlling shutter comprising a pair of parallel transparent spaced apart planar conductors and a liquid crystal material between said planar conductors, said system further comprising control means for applying an adjustable voltage between said planar conductors, whereby the transmissibility of said shutter is responsive to the amplitude of said adjustable voltage, said tablet further comprising a menu section, said control means comprising means responsive to output signals of said wand when interacting with said menu section for adjusting the voltage applied between said planar conductors and thereby controlling the light intensity incident on the rear tablet side.

7. The system of claim 6, wherein the menu section occupies a small area along the edge of the tablet.

* * * * *